219-121 SR
6/23/81 OR 4,275,287

United States Patent [19] [11] 4,275,287
Hiratake [45] Jun. 23, 1981

[54] PLASMA TORCH AND A METHOD OF PRODUCING A PLASMA

[75] Inventor: Susumu Hiratake, Kasugai, Japan

[73] Assignee: Daidoto Kushuko Kabushikaisha, Japan

[21] Appl. No.: 22,651

[22] Filed: Mar. 21, 1979

[30] Foreign Application Priority Data

Sep. 28, 1978 [JP] Japan ............................ 53-119575

[51] Int. Cl.[3] ............................ B23K 9/00

[52] U.S. Cl. .................... 219/121 PR; 219/121 PA; 219/123 PP; 219/125 PQ

[58] Field of Search ............... 219/121 P, 76.16, 123; 313/231.4, 231.5; 13/2 P, 9.7

[56] References Cited

U.S. PATENT DOCUMENTS

| | | | |
|---|---|---|---|
| 3,361,927 | 1/1968 | Buhler | 219/121 P |
| 3,403,277 | 9/1968 | Way et al. | 219/121 P |
| 3,445,191 | 5/1969 | Brunning et al. | 219/121 P |
| 3,521,106 | 7/1970 | Hess | 219/121 P |

*Primary Examiner*—Elliot A. Goldberg
*Assistant Examiner*—M. Paschall
*Attorney, Agent, or Firm*—William A. Drucker

[57] ABSTRACT

A plasma torch includes an annular cathode having an annular peripheral edge from which an arc is discharged. A pair of annular nozzle elements are coaxially disposed on the opposite sides of the cathode. Each nozzle element has an annular edge hanging over the annular peripheral edge of the cathode, and the annular edges of the nozzle elements define therebetween an annular outlet opening for the torch. Gas is introduced between the cathode and the nozzle elements and emitted through the annular outlet opening in a plasma jet. A magnetic field is developed across the annular outlet opening to cause the plasma jet to rotate along the annular peripheral edge of the cathode for its uniform emission from the entire perimeter of the annular outlet opening.

3 Claims, 31 Drawing Figures

PLASMA TORCH AND A METHOD OF PRODUCING A PLASMA

BACKGROUND OF THE INVENTION

1. Field of the Invention

This invention relates to a plasma torch producing a plasma jet in an enlarged area in which to treat the material to be treated, and a method of generating a plasma extending over such an enlarged area.

2. Description of the Prior Art

A typical plasma torch known in the art emits a plasma jet extending like a rod. This plasma jet has a very high temperature and travels exactly along a straight line, so that it can effectively be used for the localized heating of a particular place. It is very effective for the purpose of locally heating only a particular spot of a large object and melting the material of that spot alone.

SUMMARY OF THE INVENTION

It is an object of this invention to provide a plasma torch which produces a plasma jet in a sheetlike form. The sheetlike extension of a plasma jet provides an enlarged area of radiation which makes it possible to heat a large surface of the work at a time.

BRIEF DESCRIPTION OF THE DRAWINGS

FIGS. 5-1 through 5-4 are sectional views illustrating different forms of plasma torch embodying this invention;

DESCRIPTION OF THE PREFERRED EMBODIMENTS

Figure 1:
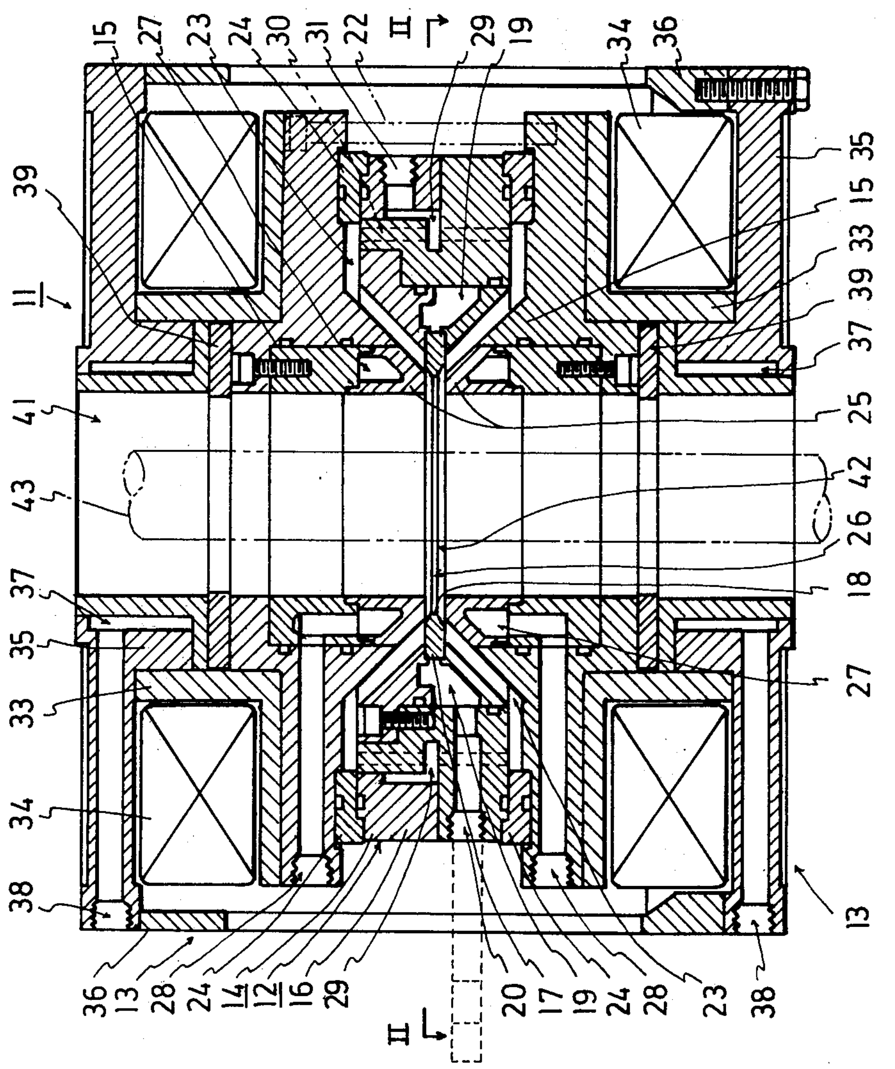
FIG. 1 is a longitudinal sectional view of a plasma torch embodying this invention.

Referring to FIGS. 1 through 4 of the drawings, there is shown a plasma torch 11 which essentially comprises a torch body 12 and a magnetic field generator 13. The torch body 12 includes an annular cathode 14 and a pair of nozzle elements 15 disposed on the opposite sides of the cathode 14 coaxially therewith. The cathode 14 is formed by an annular body 16 and an annular electrode member 17 attached to the inner peripheral edge of the body 16. The electrode member 17 has an inner peripheral edge 18 from which an arc is emitted. As the electrode member 17 provides a source of emitting thermions, it is formed from a material having a high melting point and capable of emitting a large quantity of thermions, for example, tungsten containing thorium. The cathode body 16 is pierced with a water passage 19 through which water is circulated to cool the electrode member 17. The water passage 19 is annular and encircles the electrode member 17. The cathode body 16 is provided on its outer periphery with a water inlet 20 leading to the water passage 19. The water inlet 20 is adapted for threaded connection with a water circulating pipe not shown. A terminal 21 is provided on the cathode body 16 to connect it with a power source.

The nozzle elements 15 are formed from a material having a high melting point and a high thermal conductivity, such as copper. Each of the nozzle elements 15 is somewhat spaced from the cathode 14 by an annular insulator 24. The nozzle elements 15 are held together by clamping bolts 22. Each nozzle element 15 has an inner peripheral edge 25 hanging over the inner peripheral edge 18 of the electrode member 17 as best shown in FIG. 1. The inner peripheral edges 25 of the two nozzle elements 15 define therebetween with the electrode member 17 an annular opening 26 communicating with a gas passage 23 formed between the cathode 14 and each nozzle element 15. The cathode body 16 is pierced with an annular gas passage 29 which is connected with the gas passages 23 through a plurality of holes 30. The cathode body 16 is provided on its outer periphery with a gas inlet 31 leading to the gas passage 29. The gas inlet 31 is adapted for threaded connection with a gas pipe, not shown, for supplying gas through the gas passages 29 and 23 to the annular opening 26 in front of the electrode member 17. Each nozzle element 15 is pierced with an annular water passage 27 through which water is circulated to cool the inner peripheral edge 25. Each nozzle element 15 is provided on its outer periphery with a water inlet 28 leading to the water passage 27. The water inlet 28 is adapted for threaded connection with a water pipe, not shown, for circulating water through the water passage 27.

The magnetic field generator 13 includes a pair of annular coil supports 33 made of electrically insulating material and disposed on the opposite sides of the torch body 12 coaxially therewith. Each of the coil supports 33 supports a magnetic coil 34 thereon. Each magnetic coil 34 is associated with a magnetic core 35 which is formed from a magnetic material, such as Permalloy. The two cores 35 are held together by a cylindrical core 36 which is also made of a magnetic material. The cores 35 and 36 define a magnetic path in the magnetic field generator 13. Each of the magnetic cores 35 is pierced with an annular water passage 37 and provided on its outer periphery with a water inlet 38 leading to the water passage 37. The water inlet 38 is of construction adapted for threaded connection with a water pipe, not shown, for circulating water through the water passage 37. An annular heat shielding plate 39 is provided between each nozzle element 15 and the corresponding one of the magnetic cores 35. The heat shielding plates 39 are made of a heat insulating material, such as alumina.

Figure 3:
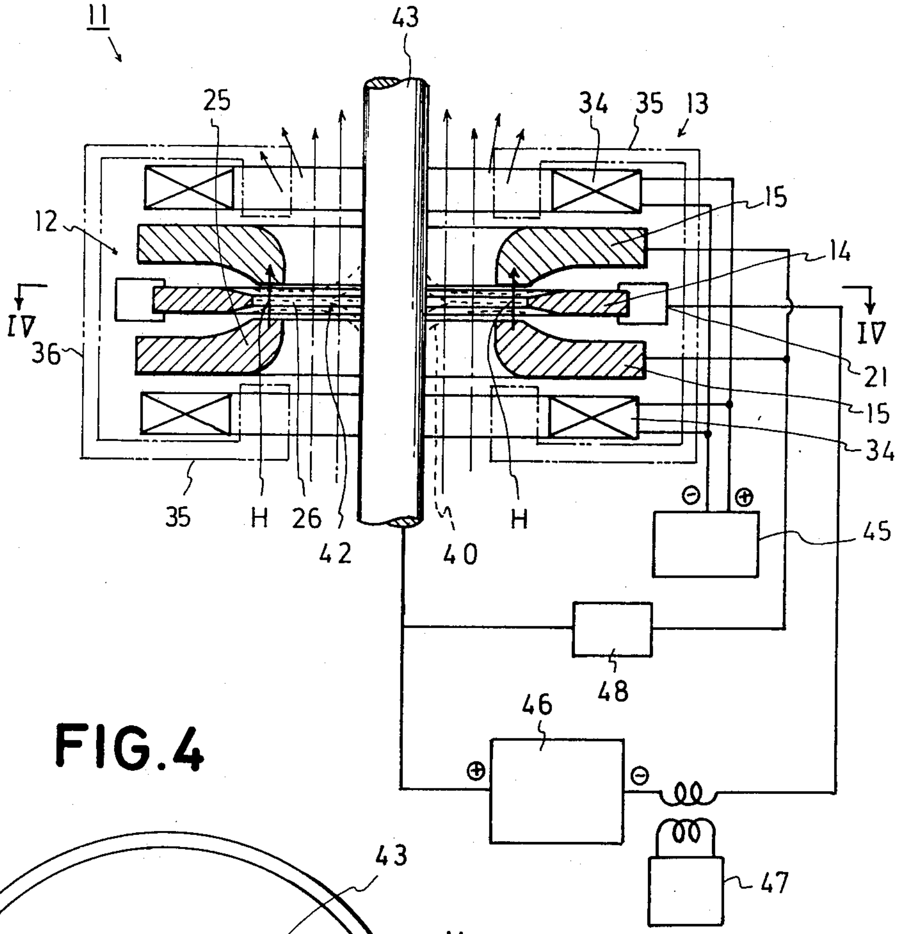
FIG. 3 is a schematic cross-sectional view showing the operation of the plasma torch of FIG. 1.

To prepare the plasma torch 11 for operation, the magnetic coils 34 are electrically connected with a power source 45 for supplying an electric current to the coils 34 as shown in FIG. 3. The plasma torch 11 has an axial hollow cylindrical chamber 41, in which the material 43 to be treated is placed. A power source 46 for supplying a direct current and a high frequency generator 47 for ignition purposes are electrically connected across the cathode 14 and the material 43 to be treated. In the event the material 43 to be treated is to serve as an anode, the positive terminal of the power source 46 is electrically connected through a resistor 48 to the nozzle elements 15 to supply a pilot current to the nozzle elements 15. In operation, a direction current is supplied from the power source 45 to the magnetic coils 34 to generate across the annular opening 26 in the torch body 12 a magnetic field oriented in a direction indicated by arrows H in FIG. 3 or a direction opposite thereto, so that the magnetic field may extend perpendicularly to the direction in which a plasma jet is emitted as will hereinafter be described.

A gas intended to form a plasma, such as argon, hydrogen and nitrogen, is introduced through the gas inlet 31, and ejected through the annular opening 26 toward the axis of the electrode member 17. At the same time, a direct current is applied across the cathode 14 and the material 43 to be treated, the latter serving as a positive electrode. A high frequency voltage in the order of several thousand volts is supplied from the high frequency generator 47 and applied across the cathode 14 and the nozzle elements 15 through the resistor 48 in a well known manner to develop a high frequency discharge between the cathode 14 and the nozzle elements 15, so that a pilot arc may be produced along the inner peripheral edge 18 of the electrode member 17. The material 43 to be treated is brought to a closer position relative to the pilot arc in a well known manner to develop a main arc reaching from the annular opening 26 along the inner peripheral edge of the cathode 14 to the material 43 to be treated. To bring the material 43 closer to the pilot arc, it may be mechanically displaced transversely. It is also possible to use a well known ignition rod. Alternatively, the material 43 to be treated may be provided with an increased diameter portion which may, at the time of ignition, be placed opposite to the inner peripheral edge 18 of the electrode member 17. The main arc thus emitted from a portion of the inner peripheral edge 18 of the annular electrode member 17 through the annular opening 26 is immediately thereafter forced to rotate along the inner peripheral edge 18 of the electrode member 17 under the influence of the magnetic field prevailing across the annular opening 26. The rotation of the arc provides emission of a plasma jet 40 radially inwardly spreading from the inner peripheral edge 18 of the electrode member 17 over an annular region 42 having a uniform temperature distribution in which the material 43 to be treated may be effectively heated.

The speed of rotation of the arc should be adjusted to suit the specific application for which the plasma torch will be used, since it depends on the amperage of the plasma, the intensity of the magnetic field produced by the magnetic field generator, the rate of flow of the gas introduced to produce a plasma, and the distance between the cathode and the anode or the material to be treated.

The rotation of the arc as described above causes a point of arc discharge to move along the inner peripheral edge 18 of the electrode member 17. This permits uniform heating of the entire inner peripheral edge 18 of the electrode member 17, resulting in the enlargement of the area from which thermions are emitted, making it possible to maintain a sufficiently high amperage in the plasma even at a relatively low temperature. Upon the beginning of the entire inner peripheral edge 18 to discharge an arc, the application of electric current to maintain the magnetic field may be discontinued if the inner peripheral edge 18 is at a temperature which is sufficiently high to enable a stable arc discharge from the inner peripheral edge 18.

Since the inner peripheral edge 18 from which the arc is discharged can be maintained at a relatively low temperature, the plasma torch of this invention may be used to form a plasma from a gas having a higher content of active gas than is possible with the apparatus known in the art, without causing any increase whatsoever in the wear of the cathode due to the reaction thereof with the active gas.

Figure 4:
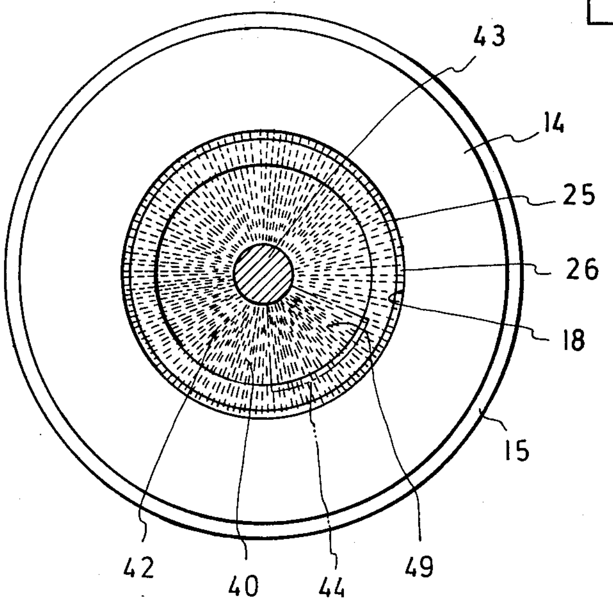
FIG. 4 is a cross-sectional view taken on the line IV—IV of FIG. 3.

The apparatus of this invention may further include a gas shielding plate 44 closing a portion of the annular opening 26 as shown in FIG. 4 to define an inoperative region 49 in the cylindrical chamber 41 which may restrict the annular region 42 providing a space for treatment to a sectorial shape. This restriction of the space for treatment is beneficial for partial heating of the material 43 to be treated.

Figures 1, 5:
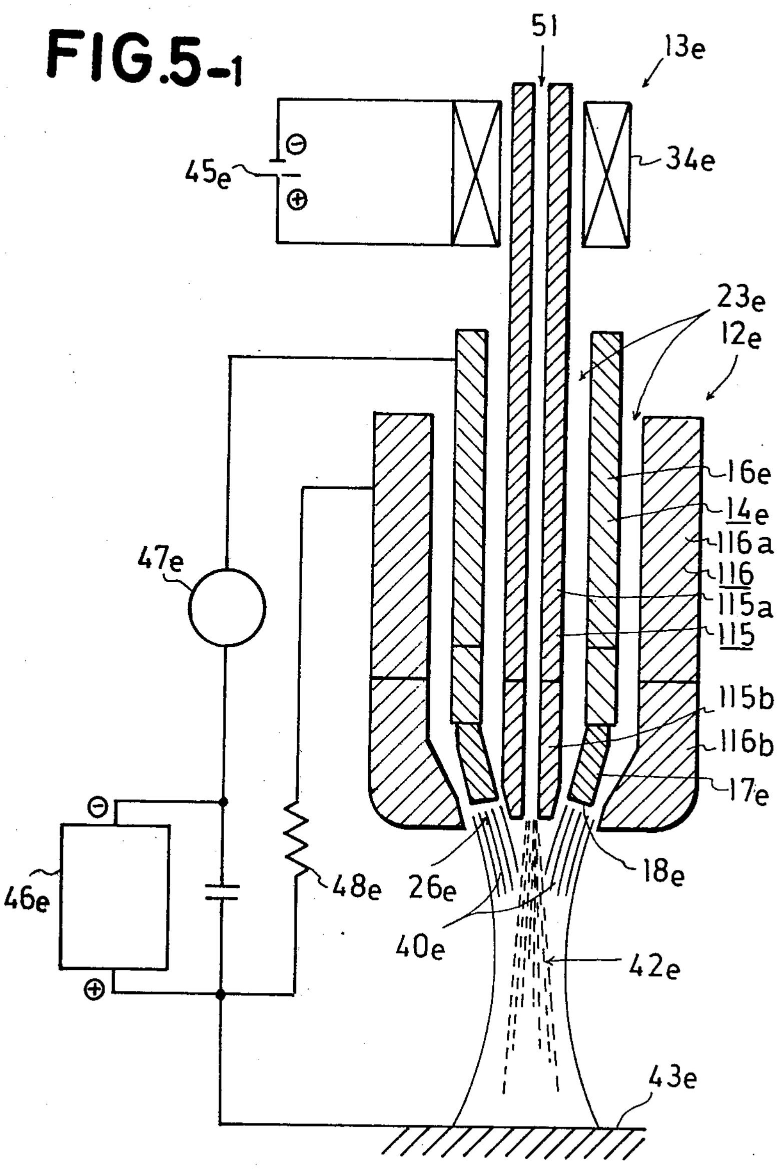
Figures 2, 5:
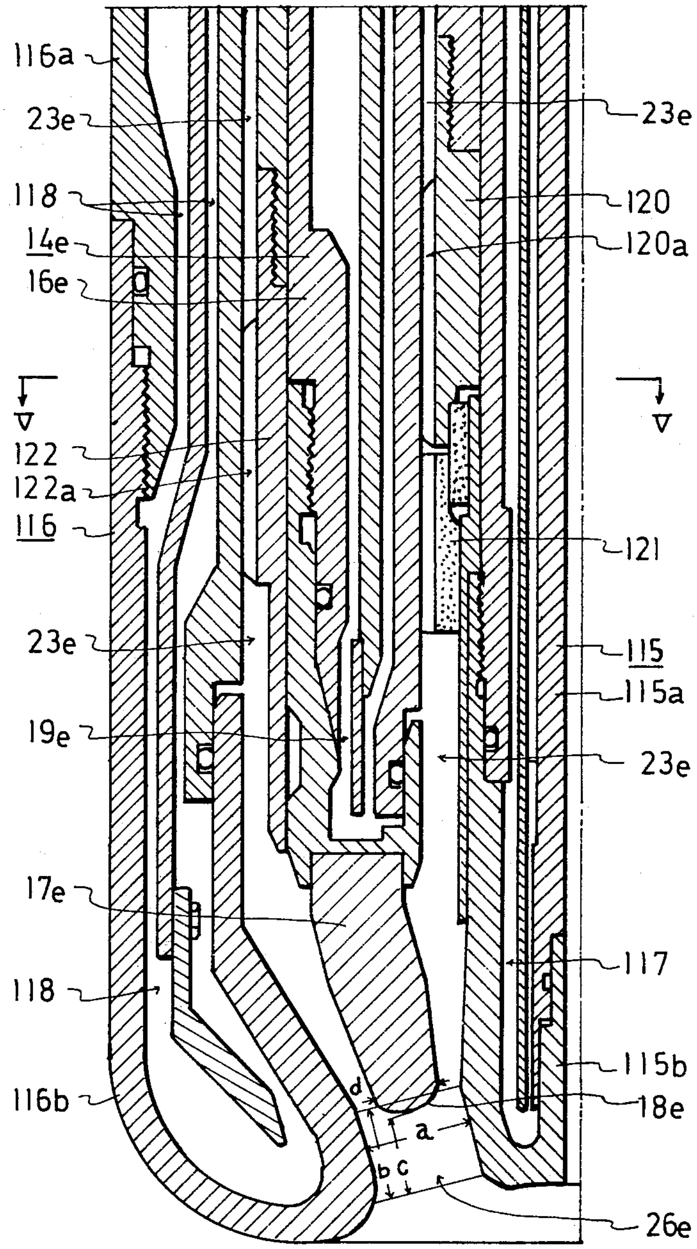
Figures 4, 5:
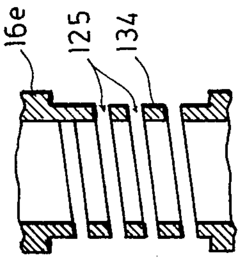
Figures 3, 5:
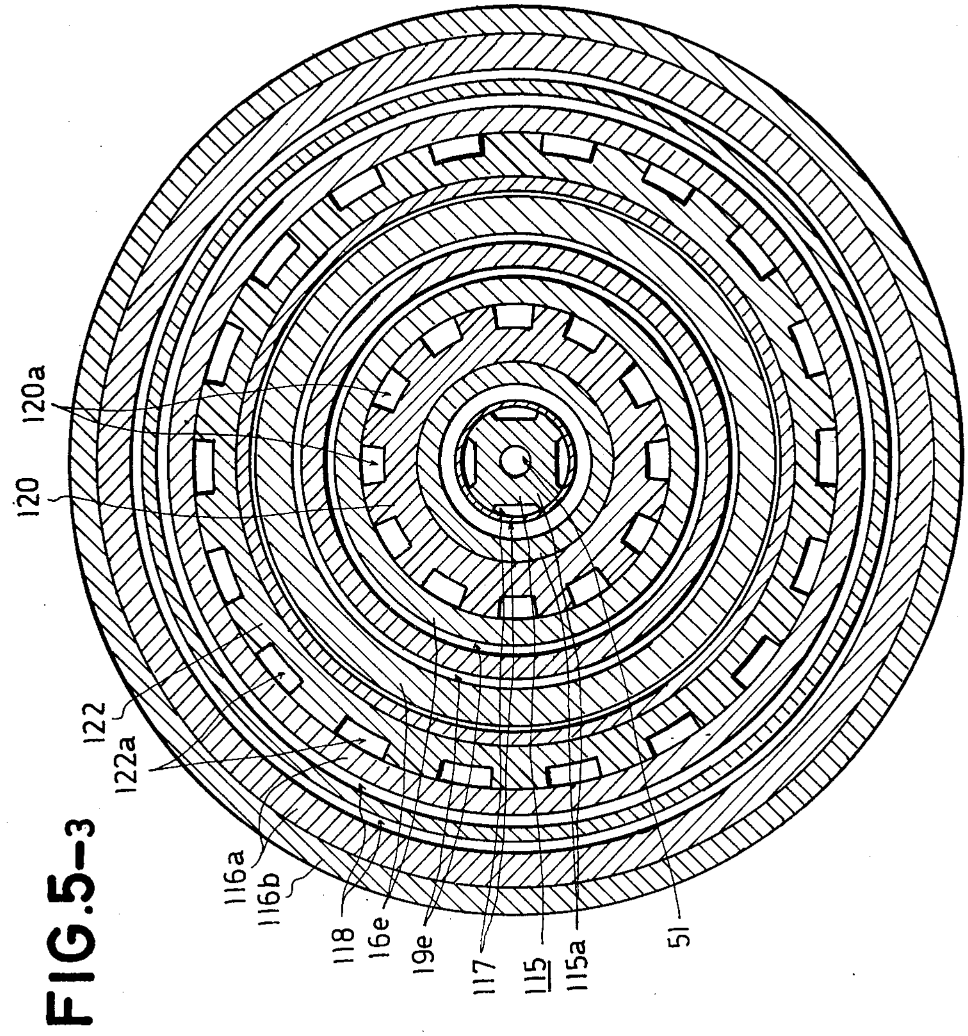

While both the power source 45 and 46 have been described as a source of direct current, it is equally possible to use instead mutually synchronized sources of alternating current supply.

attention is now directed to FIGS. 5-1 through 5-3 of the drawings in which another form of the plasma torch embodying this invention is shown. It includes a torch body **12*e* and a magnetic field generator 13*e*. The torch body 12*e* includes an inner nozzle 115 of the elongated tubular construction having an axial bore 51 extending along its entire length. The inner nozzle 115 comprises a body 115*a* formed from a magnetic material, and a nozzle element 115*b* made of copper and connected to one end of the body 115*a*. An outer nozzle 116 of the hollow cylindrical construction encircles the inner nozzle 115 in coaxial relation therewith, and comprises a main body 116*a* and a nozzle element 116*b* made of copper and connected to one end of the main body 116*a*. The nozzle element 116*b* of the outer nozzle 116 has a lower end having an internal wall surface shaped like a truncated cone. The lower end of the nozzel element 116*b* defines with the lower end of the inner nozzle element 115*b* an annular opening 26*e* through which an arc 40*e* is discharged. Because of the lower end configuration of the outer nozzle element 116*b*, the annular opening 26*e* does not lie in a flat plane, but resides in a curved plane having a part-spherical shape. Thus, the annular opening 26*e* is, at any portion thereof, directed at an angle toward a line extending through the longitudinal axis of the inner nozzle 115, so that the arc 40*e* discharged through the annular opening 26*e* may take the shape of a funnel or a V shape in vertical cross section as shown in FIG. 5-1. The plasma torch further includes a cathode 14*e* of the hollow cylindrical construction interposed between the inner and outer nozzles 115 and 116 coaxially therewith. The main body 115*a* of the inner nozzle 115 extends into a magnetic coil 34*e* in the magnetic field generator 13*e* and serves as a magnetic coil to transmit a magnetic field generated by the coil 34*e* to the annular opening 26*e***.

Figure 2:
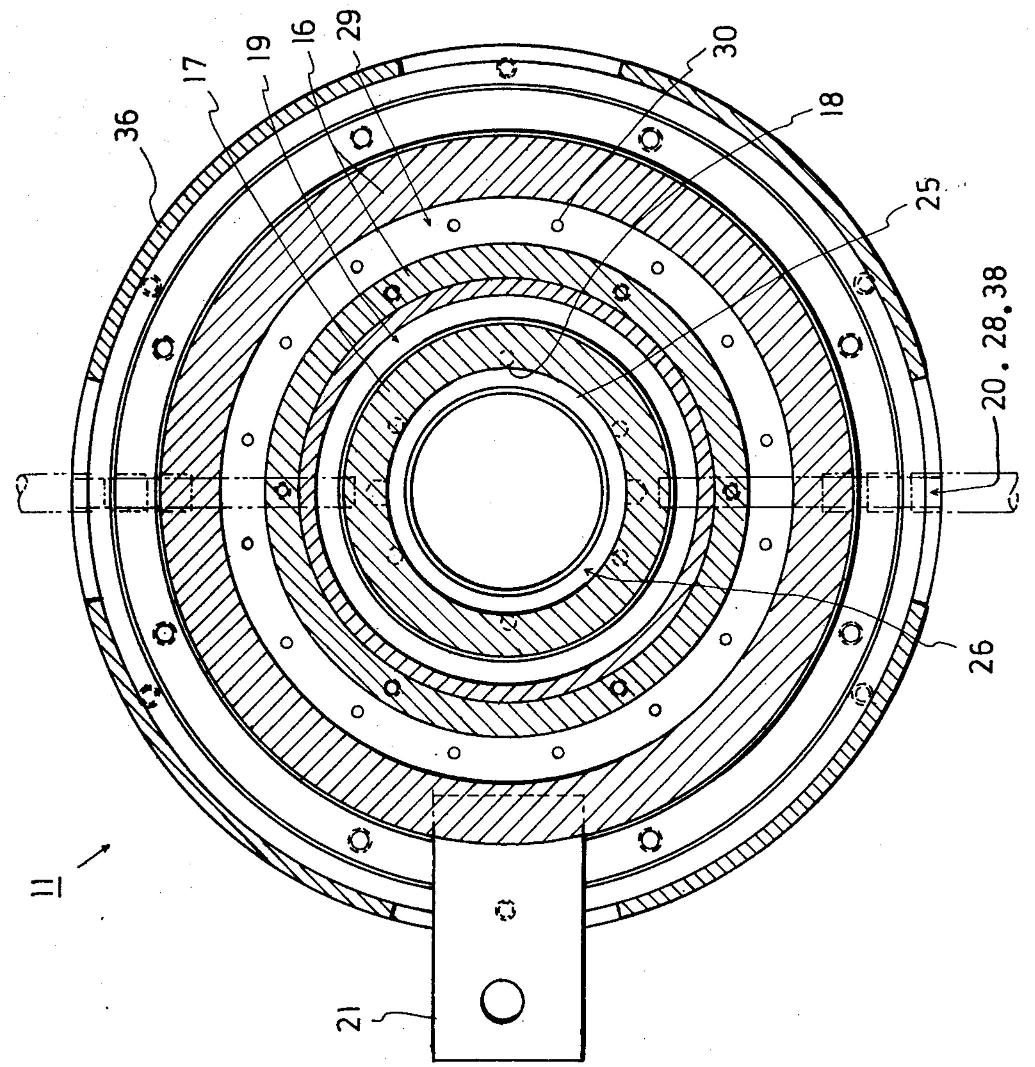
FIG. 2 is a cross-sectional view taken on the line II—II of FIG. 1.

Referring to FIGS. 5-2 and 5-3 showing further details of the torch body **12*e* in an enlarged fashion, the cathode 14*e* also comprises a main body 16*e* and an electrode member 17e connected to one end of the main body 16e. The electrode member 17e is removable from the main body 16e to facilitate replacement when it is worn after use. For the same reason, the nozzle elements 115b and 116b are also removable from the main bodies 115a and 116a, respectively, of the inner and outer nozzles 115 and 116. The cathode 14e, the inner nozzle 115 and the outer nozzle 116 are each pierced with a water passage 19e, 117 or 118** through which cooling water is circulated.

A cylindrical spacer 120 is interposed between the inner nozzle 115 and the cathode 14e to maintain them in properly spaced relation from each other. The spacer 120 is also intended for stabilizing the flow of gas through a gas passage 23e and preventing a high frequency discharge from occurring between the inner nozzle 115 and the cathode 14e. The spacer 120 is formed from an electrically insulating material, such as Teflon (trade name). The spacer 120 is, as shown in FIG. 5-3, provided with a plurality of longitudinal grooves 120a through which gas flows to stabilize the flow of gas through the gas passage 23e. Such a spacer of an electrically insulating material is preferably provided to extend along the entire length of the gas passage 23e. The inner nozzle 115 is further encircled by a heat shielding sleeve 121 which is located below the spacer 120 in close proximity thereto in order to shield heat of an arc. The sleeve 121 is formed from a highly heat resistant material, for example, boron nitride. Another cylindrical spacer 122 is interposed between the cathode 14e and the outer nozzle 116 and has a plurality of longitudinal grooves 122a. The spacer 122 is provided for the same purposes as those for which the aforementioned spacer 120 is provided.

The relative positions and dimensions of the inner nozzle 115, the outer nozzle 116 and the cathode 14e at the lower ends thereof, as indicated at a, b, c, and d in FIG. 5-2, depend upon the current capacity for which the torch is designed, but are preferably determined to establish the following relationship in order to obtain a stabilized arc:

$$a/b \simeq 1$$

$$c \simeq 0.96b$$

The plasma torch of FIG. 5-1 is operated in a similar manner to the apparatus of FIG. 1 to produce a plasma arc 40e. The magnetic field generated by the magnetic field generator 13e is transmitted to the annular opening 26e through the main body 115a of the inner nozzle 115 which is formed from a magnetic material. The plasma arc 40e thus discharged is forced to rotate in the vicinity of the annular opening 26e to define a funnel-shaped arc. Gas is preferably introduced into the gas passage 23e so as to rotate, upon ejection through the annular opening 26e, in a direction equal to that of rotation of the arc to enhance rotation of the arc.

The arc thus produced may be used for a variety of applications as hereunder mentioned.

(1) Formation of a plasma from an active gas.

An active gas which is to be transformed into a plasma is introduced through the axial bore 51 of the inner nozzle 115, and blown into the bottom of the funnel-shaped arc 40e, whereupon the active gas is heated by the arc 40e at high temperature and transformed into a plasms. The cathode 14e is not contacted with any of the active gas blown through the axial bore 51, but is highly durable for a prolonged period of time without being corroded by any such active gas.

Accordingly to the invention, the active gas is introduced into the center of the arc, so that all of the gas introduced can be transformed into a plasma. It is possible to obtain a plasma of oxygen which may advantageously be used for high temperature refining operations, particularly for the manufacture of ultra-low carbon steel by decarburization. It is also possible to produce a high temperature active reducing gas by producing a plasma of carbon monoxide or transforming steam or carbon dioxide into a reducing gas (by decomposition into hydrogen and carbon monoxide). Such a reducing gas is useful for the advanced reducing treatment of ores and molten metals.

(2) Heat treatment of a fluid, such as fine powder, liquid and gas.

The fluid to be heat treated is introduced through the axial bore 51 of the inner nozzle 115 into the bottom of the funnel-shaped arc 40e. The fluid may be dropped directly through the axial bore 51, or alternatively, a reactive gas may be used as a carrier. Heat treatment of a fluid according to this invention may be useful for a variety of applications, including the following:

(a) Thermal cracking of pulverized coal or heavy oil to produce a high calorie gas;

(b) Synthesis of a compound from powder of a metal and a gas (e.g., $Al + \frac{1}{2}N_2 — AlN$);

(c) Reduction of metal oxides, such as $Fe_2O_3$, $VO_5$, NiO and $Al_2O_3$ to metals; and (d) Ultra-fine pulverization and spheroidizing treatment.

According to the invention, the fluid to be treated can advantageously be fed into the center of a plasma to undergo most effective and uniform treatment.

(3) High temperature slag refining of metal.

A slag, such as CaO, is carried on an inert gas and introduced through the axial bore 51 of the inner nozzle 115. The slag is melted by a plasma into vapors and these vapors are injected into the metallic container of a smelting furnace. The plasma can easily heat the slag to a temperature above its melting point to facilitate active high temperature slag refining of metal. This invention is further advantageous in ensuring heating of all the slag introduced into the apparatus without allowing the torch to be adversely affected by the slag.

(4) Surface treatment of metal or the like by spraying.

The material with which an object is to be treated is ejected through the inner nozzle and sprayed on the surface of the object for the coating, padding or other surface treatment thereof. The plasma torch of this invention can, without being adversely affected in any way, heat all of the material to be sprayed, uniformly to an optimum temperature for any intended surface treatment. Thus, the present plasma torch provides a high yield of production by ensuring uniform surface treatment.

FIG. 5-4 is a fragmentary representation of a modified form of the magnetic field generator, specifically its magnetic coil. According to this embodiment, the magnetic coil 34e is replaced with a magnetic coil 134 which is formed by cutting a spiral groove 125 on a portion of the main body 16e of the cathode 14e. The coil 134 generates a magnetic field when fed with electric current.

As a further alternative to the construction of the magnetic field generator, the inner nozzle 115 itself may be formed from a permanent magnet, or a separate permanent magnet may be positioned in the vicinity of the inner nozzle 115. Further, a magnetic coil may be positioned either inside or outside of the cathode 14*e*. Furthermore, the magnetic coil may be so positioned as to encircle the torch body 12*e*.

Figure 6:
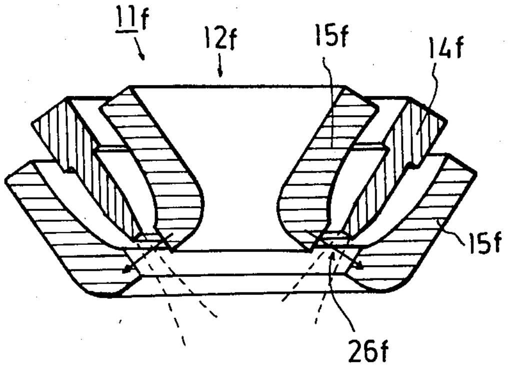
FIGS. 6 through 8 are fragmentary sectional views showing different examples of the plasma torch of this invention as emitting plasma jets in different directions.
Figure 7:
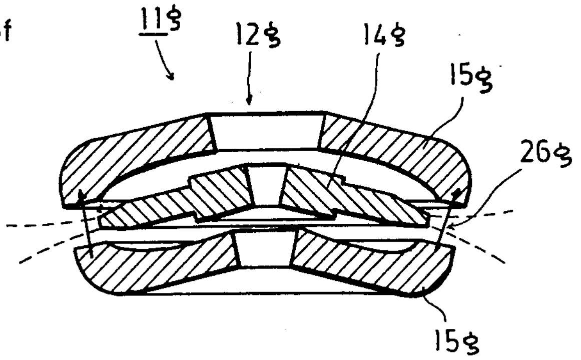
Figure 8:
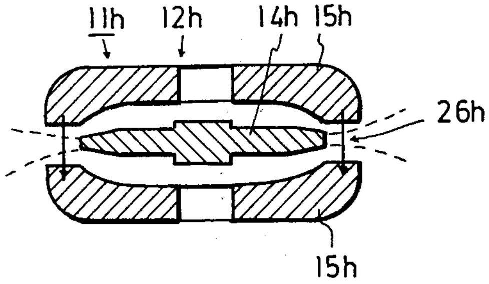

Referring to FIGS. 6 through 8, there are shown a few examples of the plasma torch embodying this invention which are designed for emitting an arc discharge in different directions. As can readily be seen from the drawing, the plasma torch 11*f* of FIG. 6 discharges an arc through its annular opening 26*f* obliquely at an angle to the longitudinal axis of a torch body 12*f*. The plasma torch 11*g* of FIG. 7 discharges an arc through its annular opening 26*g* outwardly obliquely. The plasma torch 11*h* of FIG. 8 dicharges an arc through its annular opening 26*h* horizontally outwardly in a direction entirely opposite to the direction of the arc discharge by the plasma torch 11 of FIG. 1.

Figure 9:
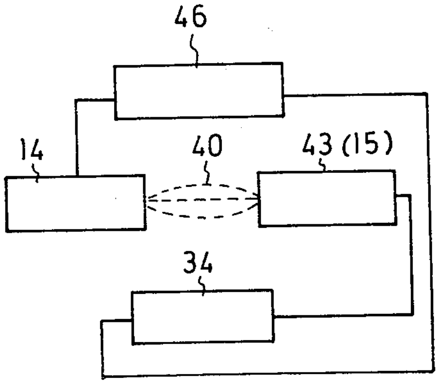
FIGS. 9 and 10 are diagrams showing different circuits for supplying an electric current to the magnetic coil.
Figure 10:
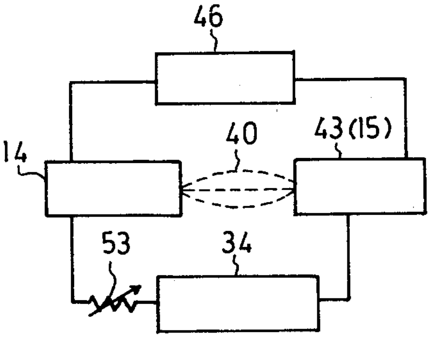

FIGS. 9 and 10 are each a diagrammatic representation of a modified circuit through which electric current is supplied to the magnetic coil 34. In the circuit of FIG. 9, all of the electric current supplied across the cathode 14 and the material 43 to be heated is fed to the magnetic coil 34, while in the circuit of FIG. 10, electric current is supplied from the power source 46 to the coil 34 through a resistor 53.

Figure 11:
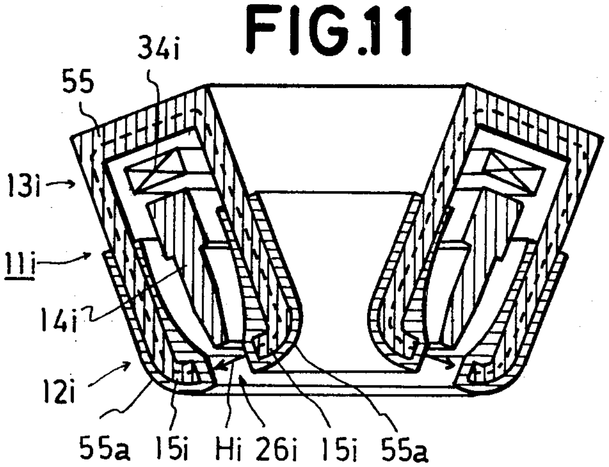
FIG. 11 is a schematic sectional view of a modified form of magnetic field generator.

FIG. 11 shows a plasma torch 11*i* having a modified magnetic field generator 13*a*. The magnetic field generator 13*i* comprises a magnetic coil 34*i* and a magnetic core 55 formed from a magnetic material. The core 55 has an end 55*a* embedded in a nozzle element 15*i* to produce a magnetic field across an annular opening 26*i* in a direction indicated by an arrow H*i*. The nozzle element 15*i* may, if desired, be formed from a magnetic material to serve as a part (end 55*a*) of the core 55.

Figure 13:
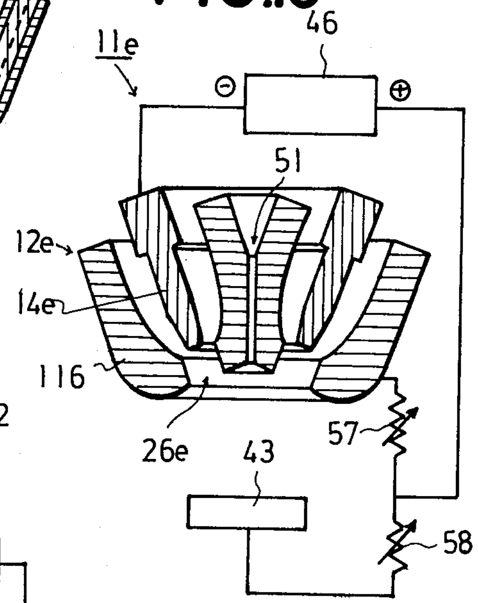
FIGS. 12 through 15 illustrate different examples of the circuit through which an electric current is supplied to produce a plasma.
Figure 12:
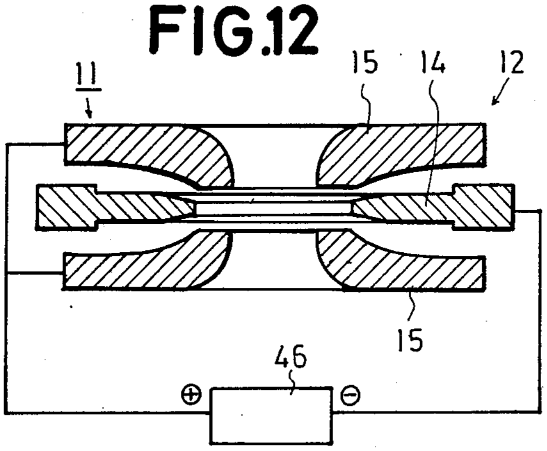
Figure 14:
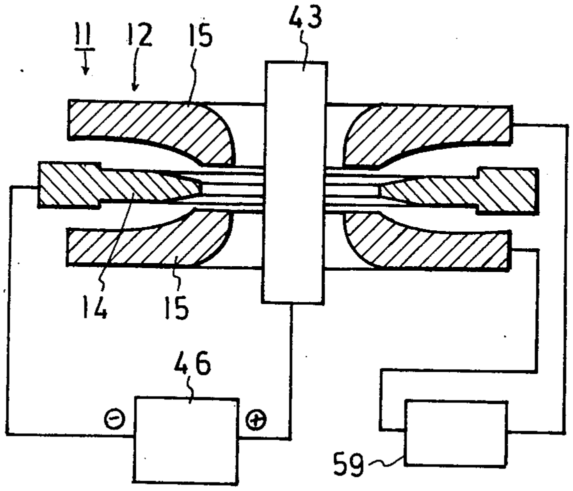
Figure 15:
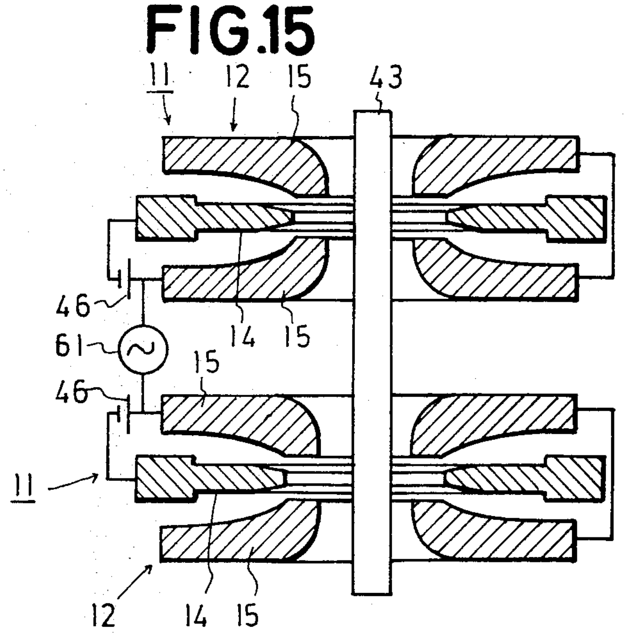

FIGS. 12 through 15 illustrate several examples of modified circuits through which electric current is supplied to produce a plasma. In the circuit of FIG. 12, both of the cathode 14 and the nozzle elements 15 are electrically connected to the power source 46 directly. FIG. 12 represents a modified electrical arrangement of the plasma torch of FIG. 1. FIG. 13 shows a modified electric circuit for the apparatus of FIG. 5-1, in which the cathode 14*e* is electrically connected to the negative terminal of the power source 46, and the outer nozzle 116 and the material 43 to be treated are connected to the positive terminal of the power source 46 through resistors 57 and 58, respectively. In FIG. 14 showing the plasma torch 11 of FIG. 1, the cathode 14 is electrically connected to the negative terminal of the power source 46 and the material 43 to be treated is connected to the positive terminal of the power source 46. A source of alternating current 59 is connected across the two nozzle elements 15. The electrical arrangement of FIG. 14 permits an arc occurring between the cathode 14 and the material 43 to be superposed on an arc discharged between the nozzle elements 15. FIG. 15 illustrates an electrical arrangement for a pair of plasma torches 11 employed in combination. Each torch body 12 is electrically connected to the power source 46 in the same manner as shown in FIG. 12. A source of alternating current 61 is connected across the nozzle elements 15 of each torch 11.

Figure 16:
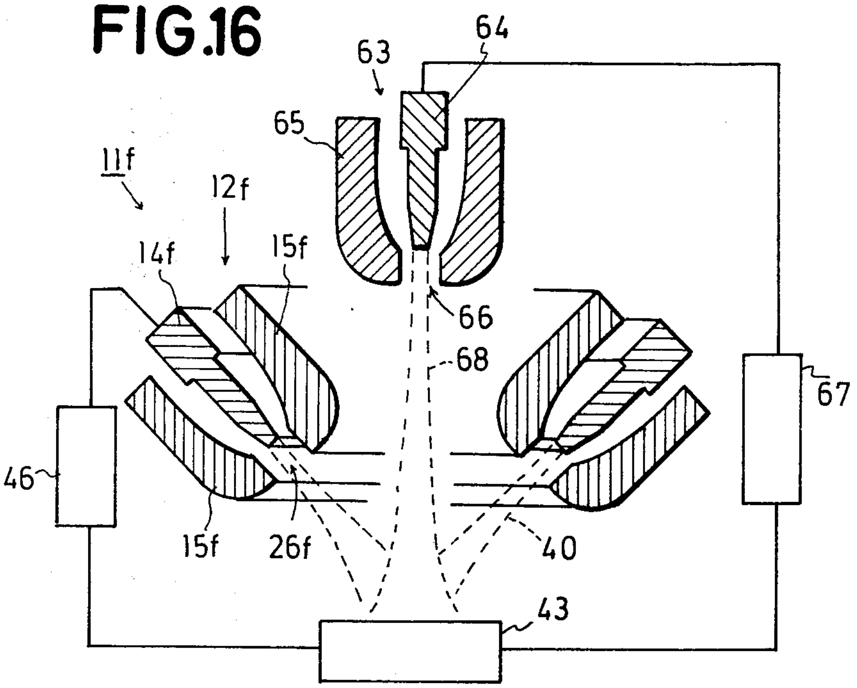
FIGS. 16 and 17 are each a schematic illustration of the apparatus in which a plurality of plasma torches are employed in combination.
Figure 17:
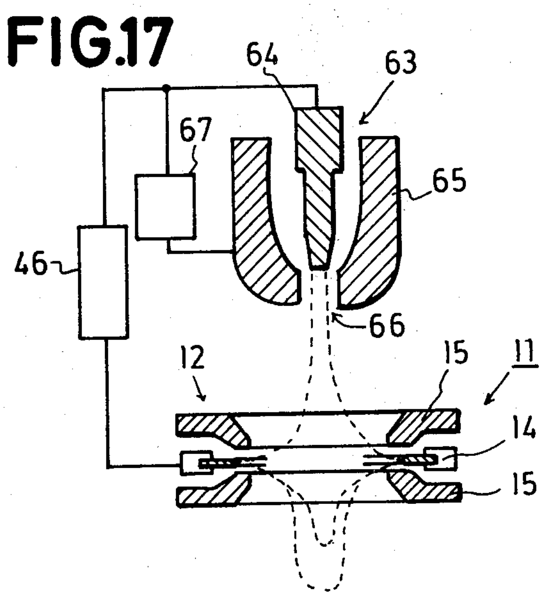

FIGS. 16 and 17 are each a further representation of the apparatus in which a plurality of plasma torches are employed. In the apparatus of FIG. 16, a plasma torch 63 of the construction known in the art is disposed coaxially with a plasma torch 11*f* of the construction shown in FIG. 6. The plasma torch 63 comprises a rod-shaped cathode 64 and a cylindrical nozzle 65 surrounding the cathode 64. A power source 67 (primarily of direct current) is connected between the cathode 64 and the material 43 to be treated. The cylindrical nozzle 65 defines a circular opening 66 which is coaxial with the annular opening 26*f* of the plasma torch 11*f*. The material 43 to be treated is so positioned that it is radiated simultaneously with both an arc 40 discharged through the annular opening 26*f* of the plasma torch 11*f* and an arc 68 discharged through the opening 66 of the plasma torch 63. In the apparatus of FIG. 17, a plasma torch 63 of the known construction shown in FIG. 16 is disposed coaxially with a plasma torch 11 of the construction shown in FIG. 1. The power source 46 is connected between the cathode 14 of the plasma torch 11 and the cathode 64 of the plasma torch 63. The power source 67 is connected between the cathode 64 and the nozzle 65 of the plasma torch 63.

Figure 18:
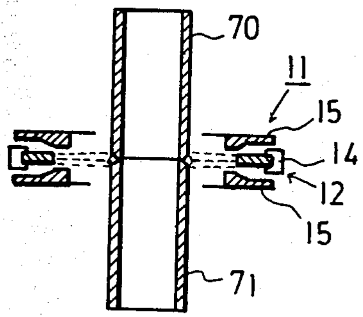
FIG. 18 through 28 illustrate a variety of arrangements in which the plasma torches of this invention may be applied.
Figure 19:
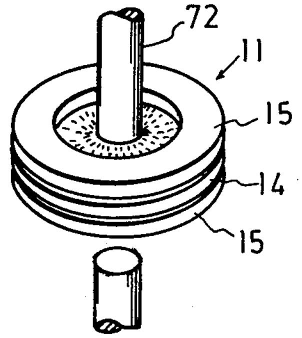
Figure 20:
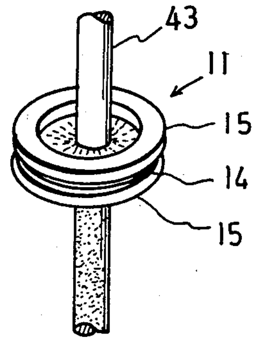

Reference is now made to FIGS. 18 through 28 illustrating a variety of applications for which the plasma torch embodying this invention may be advantageously employed. In the arrangement of FIG. 18, the plasma torch 11 of FIG. 1 is employed to weld a pair of pipes 70 and 71 coaxially. In FIG. 19, the plasma torch 11 of FIG. 1 is used to cut a bar 72. FIG. 20 shows an application in which the plasma torch 11 of FIG. 1 is utilized to spray coating material on the material 43 to be treated. The coating material may be introduced, together with a gas being transformed into a plasma, through a passage provided between the cathode 14 and the nozzle elements 15, or alternatively, it may be transported on a carrier gas through a passage pierced in the nozzle elements 15 in fluid communication with the annular opening 26 of the torch 11. A plasma may advantageously be formed from nitrogen or methane for nitriding or carbonization of the surface of the material 43 to be treated.

Figure 21:
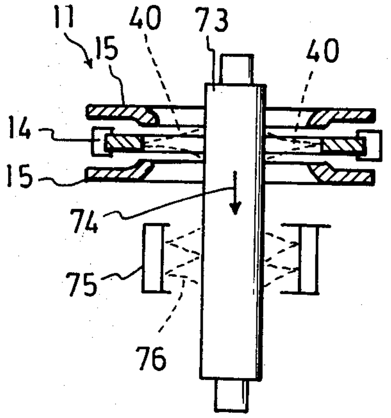
Figure 22:
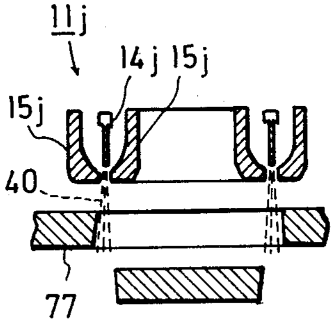

The application of FIG. 21 shows the plasma torch 11 of FIG. 1 which is used for hardening a roll 73. The roll 73 is heated by a plasma 40 during its movement through the plasma torch 11 in the direction of an arrow 74, followed by forced cooling with a splash of water 76 from a cooling device 75. FIG. 22 shows a plasma torch 11*j* designed to discharge a plasma advancing in parallel to the longitudinal axis of the torch. The plasma torch 11*j* is used for cutting a hole in a plate 77.

Figure 23:
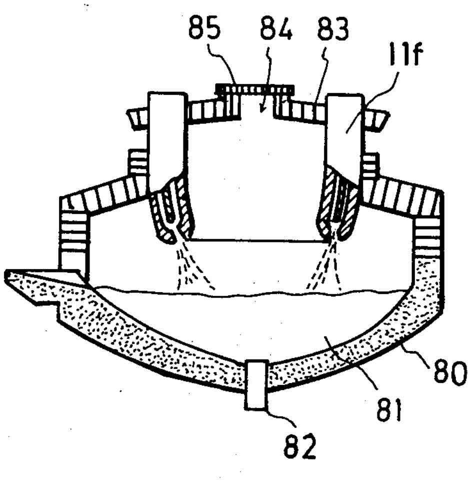

FIG. 23 illustrates the application of the plasma torch 11*f* of FIG. 6 for melting a metal. A furnace body 80 constructed with refractory material in a well known manner contains the material 81 to be melted. An electrode 82 is provided at the bottom of the furnace body 80 to establish a supply of electric current to the material 81 to be melted. The plasma torch 11*f* is secured to a furnace roof 83 which is supported for vertical movement to and away from the furnace body 80. The furnace roof 83 is centrally provided with an opening 84 through which an alloy is thrown into the furnace body 80. The opening 84 is normally closed by a cover 85. According to the arrangement of FIG. 23, the plasma torch 11*f* having an annular opening at its outlet radiates a plasma jet over an enlarged surface area of the material 81 to be melted, thereby producing a remarkably advantageous effect of heating the material 81 quickly to a uniform temperature.

Figure 24:
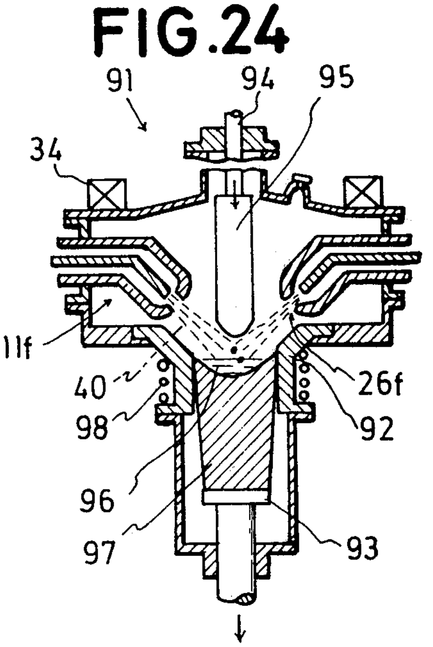

Referring to FIG. 24, the plasma torch 11*f* of FIG. 6 is now used for remelting a bar 95. A remelting furnace 91 includes a crucible 92 constructed of copper in a well known manner, and which is water cooled. A bar holder 94 is supported vertically movably in a well known manner and carries the bar 95 at its lower end. The plasma torch **11*f* emits a plasma jet 40 which melts the lower end of the bar 95, and the molten metal of the bar 95 drops into the crucible 92. The bar 95 is gradually lowered as its lower end is melted, and a bath 96 of molten metal is built up in the crucible 92. The molten metal 96 solidifies as it is cooled in the water-cooled crucible 92, and the bottom 93 of the crucible 92 is gradually lowered as the bar 95 is melted, so that an ingot 97 into which the molten metal 96 has solidified is downwardly withdrawn. The crucible 92 is surrounded by a coil 98 for electrically heating or stirring the molten metal 96 when necessary. The coil 98 may advantageously be substituted for the magnetic coil 34 if the coil 98 is designed for developing a magnetic field which may reach the annular opening 26*f* of the plasma torch 11*f* to cause rotation of the arc 40** as hereinbefore described.

Figure 25:
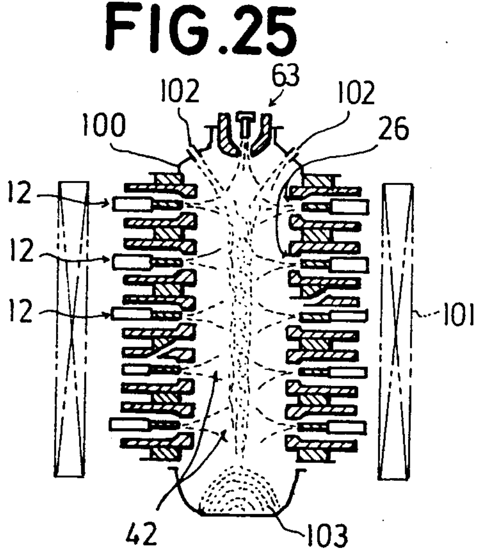

FIG. 25 illustrates an application of this invention for reaction of particles. A reactor 100 is provided with a stack of coaxially disposed torch bodies 12 of the construction shown in FIG. 1, and also includes a plasma torch 63 of the type shown in FIG. 17 which is centered on the longitudinal axis of the stack of the torch bodies 12. A magnetic coil 101 surrounds the stack to develop a magnetic field across the annular opening 26 of each torch body 12. The reactor 100 has a plurality of inlet openings 102 through which the particles to be treated are introduced. The particles are heated by a plasma jet 40 emitted from each torch and undergo reaction. The reaction product 103 collects in the bottom of the reactor 100. Since each of the torches maintains an active region 42 of uniform temperature distribution across which a plasma jet prevails, all of the particles introduced into the reactor 100 are uniformly reacted, wherever they may drop through the reactor 100. This type of reactor may advantageously be used for the synthesis of a compound or the carcking of particles. Although it is shown in FIG. 25 with a height extending along the entire height of the stack of the torch bodies 12, the magnetic coil 101 may alternatively be shortened in height and made mechanically movable for reciprocation along the longitudinal axis of the stack to create a magnetic field across the annular opening 26 of each torch. As a further alternative, the magnetic coil 101 may consist of a plurality of separate coil portions disposed one after another along the longitudinal axis of the torch bodies 12, and which may be electrically switched over to develop a magnetic field across the annular opening 26 of one torch after another.

Figure 26:
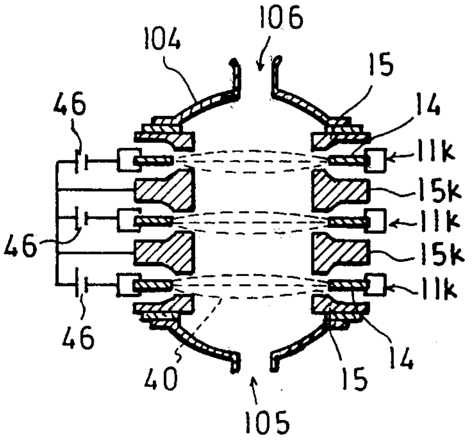

In FIG. 26, there is shown an apparatus in which gas is heated by a plurality of plasma torches. The apparatus includes a stack of three coaxially disposed plasma torches **11*k* in a casing 104. Each plasma torch 11*k* is similar in construction to the plasma torch 11 shown in FIG. 1, except that the two adjacent nozzle elements 15 of each adjoining pair of plasma torches 11 are combined into a signle nozzle element 15*k* of the unitary construction in the apparatus of FIG. 26. Gas is introduced into the casing 104 through its inlet opening 105, heated by plasma jets 40 to a high temperature, and discharged through an outlet opening 106**. The apparatus is also useful for the cracking of gas.

Figure 27:
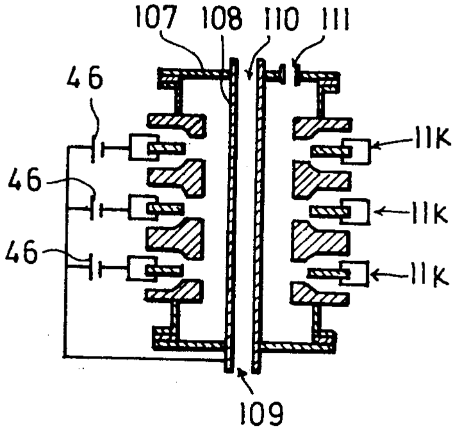

FIG. 27 illustrates an application of this invention for a heat exchanger. This heat exchanger has a casing 107 provided with a stack of coaxially disposed plasma torches **11*k* which is of the identical construction to those shown in FIG. 26. The heat exchanger includes a pipe 108 disposed on the longitudinal axis of the plasma torches 11*k*. The pipe 108 is heated by the plasma jets created by the torches 11*k*, and waste gases are discharged from the casing 107 through its outlet 111. The pipe 108 has an inlet opening 109 through which the fluid to be heated is introduced into the pipe 108. The fluid is heated while flowing through the pipe 108, and discharged through an outlet opening 110**.

Figure 28:
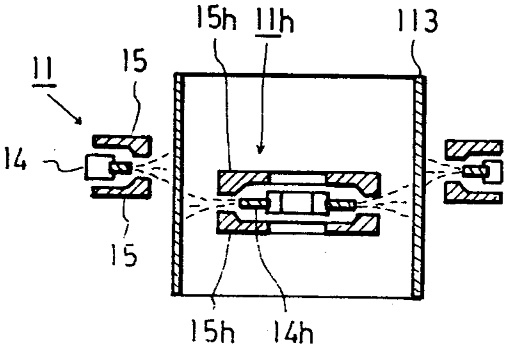

FIG. 28 illustrates an apparatus employing a combination of the plasma torch 11 shown in FIG. 1 and the plasma torch **11*h* of FIG. 8. The apparatus is used for simultaneously treating the inner and outer surfaces of a pipe 113 which is longitudinally movable relative to the plasma torches 11 and 11*h***.

The specific application and operation of this invention will further be described with reference to a couple of examples.

(1) A plasma torch of the type shown in FIG. 1 was constructed by employing an electrode member 17 formed from tungsten containing 2% of thorium, and measuring 80 mm I.D., 110 mm O.D. and 6 mm in thickness. The width of the annular opening 26 between the nozzle elements 15 was 6.9 mm. The magnetic coil 34 had 2,800 turns. Argon was introduced at the rate of 36 N liters per minute to form a plasma. A direct current of 0.7 A was supplied to the magnetic coil 34 to create a magnetic field and an arc was ignited in a well known manner, whereby a plasma jet was emitted against the material 43 to be treated having a diameter of 45 mm. The arc was found to be rapidly rotating in the form of a ring. The plasma showed an output of 300 A, 46 V.

(2) The remelting furnace 91 of FIG. 24 was used for remelting a bar of heat resistant steel having a diameter of 30 mm. The steel bar was, at its lower end, heated and melted easily, rapidly and uniformly, whereby an ingot measuring 55 mm dia. by 500 mm long was obtained. A plasma of argon obtained by introducing argon at the rate of 68 N. m/min. showed an output of 500 A, 65 V. While it was, thus, possible to melt the steel bar at the rate of 1.20 kg/min., the speed of actual melting was limited to 0.77 kg/min. in view of the delay in solidification of the molten metal.

While the invention has been described with reference to several preferred forms and applications thereof, it will be understood that further modifications, variations or applications may be easily made by those skilled in the art of making and using a plasma torch without departing from the spirit and scope defined by the appended claims.

What is claimed is:

1. A plasma torch comprising:

(i) an annular cathode having an annular inner peripheral portion with an edge face for discharge of a film-like plasma arc towards an axis of the cathode, (ii) a pair of annular nozzle elements disposed coaxially with respect to said cathode and each situated at a spacing axially at a respective side of the cathode, each nozzle element including an inner peripheral edge portion which extends beyond the inner peripheral edge face of the cathode in the direction towards said axis, a respective annular opening being defined between the inner peripheral edge portion of each nozzle element and the edge face of the cathode for discharge of gas towards the axis at each side of the arc, (iii) a magnetic field generator for exerting a magnetic field on said arc to cause said arc to rotate along said annular edge face of said cathode.

2. A plasma torch, as claimed in claim 1, wherein said annular inner peripheral portion of said cathode and said inner peripheral edge portions of said nozzles are relatively positioned and individually shaped such that the gas discharges from the respective openings are conically convergent towards said axis.

3. A plasma torch, as claimed in claim 1, wherein one said nozzle element is disposed coaxially within the other said nozzle element, and wherein said magnetic field generator comprises a hollow cylindrical member of magnetic material for inducing a magnetic field, said member having one end disposed in the vicinity of said one nozzle element, and a magnetic coil surrounding said hollow cylindrical member.

* * * * *

UNITED STATES PATENT AND TRADEMARK OFFICE

CERTIFICATE OF CORRECTION

PATENT NO. : 4,275,287

DATED : June 23, 1981

INVENTOR(S) : Susumu Hiratake

It is certified that error appears in the above—identified patent and that said Letters Patent is hereby corrected as shown below:

On the Title Page, Item [73] should read:

--(73) Assignee: Daidotokushuko Kabushikikaisha,
Japan --.

Signed and Sealed this

*Twelfth* Day of *January 1982*

[SEAL]

*Attest:*

GERALD J. MOSSINGHOFF

*Attesting Officer* *Commissioner of Patents and Trademarks*